(12) United States Patent
Petrovic et al.

(10) Patent No.: US 7,646,742 B2
(45) Date of Patent: Jan. 12, 2010

(54) METHOD OF RETRANSMISSION PROTOCOL RESET SYNCHRONISATION

(75) Inventors: Dragan Petrovic, Darmstadt (DE); Eiko Seidel, Darmstadt (DE)

(73) Assignee: Panasonic Corporation, Osaka (JP)

( * ) Notice: Subject to any disclaimer, the term of this patent is extended or adjusted under 35 U.S.C. 154(b) by 1021 days.

(21) Appl. No.: 10/761,419

(22) Filed: Jan. 22, 2004

(65) Prior Publication Data

US 2004/0208160 A1 Oct. 21, 2004

(30) Foreign Application Priority Data

Mar. 31, 2003 (EP) ................................. 03007317

(51) Int. Cl.
*H04W 4/00* (2009.01)
*H04J 3/06* (2006.01)
*H04L 12/28* (2006.01)
(52) U.S. Cl. .................... 370/328; 370/350; 370/412
(58) Field of Classification Search ................ 370/469, 370/411, 350, 468, 473, 474, 503, 328, 412
See application file for complete search history.

(56) References Cited

U.S. PATENT DOCUMENTS

| 7,194,000 | B2* | 3/2007 | Balachandran et al. . 370/395.42 |
| 2003/0016698 | A1* | 1/2003 | Chang et al. ................. 370/469 |
| 2003/0093739 | A1* | 5/2003 | Han ........................... 714/746 |
| 2003/0095519 | A1* | 5/2003 | Kuo et al. ................... 370/338 |
| 2003/0206534 | A1* | 11/2003 | Wu ............................. 370/328 |
| 2005/0063347 | A1* | 3/2005 | Sarkkinen et al. ........... 370/338 |

* cited by examiner

*Primary Examiner*—George Eng
*Assistant Examiner*—Nam Huynh
(74) *Attorney, Agent, or Firm*—Dickinson Wright PLLC (57) ABSTRACT

A method of retransmission protocol reset synchronisation in a radio network of a communication system, said radio network including at least one radio network controller RNC for controlling a plurality of base stations in communication with mobile terminals, wherein the RNC communicates with a communication terminal using a radio link control RLC procedure and the plurality of base stations communicate with the mobile terminals using a medium access control MAC procedure, comprising the steps of initiating a RLC reset procedure upon occurrence of an unrecoverable protocol error and initiating a MAC reset procedure in response to a RLC reset procedure.

11 Claims, 10 Drawing Sheets

Case b):

METHOD OF RETRANSMISSION PROTOCOL RESET SYNCHRONISATION

This invention relates to reset procedures of retransmission protocols in radio network of a mobile communication system.

The most common technique for error detection of non-real time services is based on Automatic Repeat reQuest (ARQ) schemes which is combined with Forward Error Correction (FEC), called hybrid ARQ. If an error is detected by Cyclic Redundancy Check (CRC), the receiver requests the transmitter to send additional bits. From different existing schemes the stop-and-wait (SAW) and selective-repeat (SR) continuous ARQ are most often used in mobile communication.

A data unit will be encoded before transmission. Depending on the bits that are retransmitted three different types of ARQ are defined:

Type I: The erroneous Protocol Data Units (PDUs) are discarded and new copy of that PDU is retransmitted and decoded separately. There is no combining of earlier and later versions of that PDU.

Type II: The erroneous PDU that needs to be retransmitted is not discarded, but is combined with some incremental redundancy bits provided by the transmitter for subsequent decoding. Retransmitted PDU's sometimes have higher coding rates and are combined at the receiver with the stored values. That means that only little redundancy is added in each retransmission.

Type III: Is the same as Type II only that every retransmitted PDU is now self-decodable. This implies that the PDU is decodable without the combination with previous PDU's. This is useful if some PDU's are so heavily damaged that almost no information is reusable.

Type II and Type III schemes are more beneficial from the point of view of robustness against transmission failures as received (re)transmissions are combined. In a way it is a link adaptation technique, since the redundancy can be adapted according to the channel conditions.

Another technique that falls under this category of link adaptation is adaptive modulation and coding (AMC). The principle of AMC is to change the modulation and coding format in accordance with variations in the channel conditions, subject to system restrictions. The channel conditions can be estimated e.g. based on feedback from the receiver. In a system with AMC, users in favourable positions e.g. users close to the cell site are typically assigned higher order modulation with higher code rates (e.g. 64 QAM with R=¾ Turbo Codes), while users in unfavourable positions e.g. users close to the cell boundary, are assigned lower order modulation with lower code rates (e.g. QPSK with R=½ Turbo Codes). In the following the different combinations of coding and modulation will be referred to as Modulation Coding Scheme (MCS) levels. A transmission will be split into Transmission Time Intervals (TTI), whereas the MCS level could change each TTI. TTI interval for HSDPA (High Speed Downlink Packet Access) is equal to 2 ms. The main benefits of AMC are, a) higher data rates are available for users in favourable positions which in turn increases the average throughput of the cell and b) reduced interference variation due to link adaptation based on variations in the modulation/coding scheme instead of variations in transmit power.

Transmission format of a packet has yet another configurable parameter. By increasing the number of orthogonal codes in one TTI, overall amount of information that can be transmitted is also increased. In the following text it will be referred to the number of orthogonal codes and MCS as Transmission Format Resource Combination (TFRC).

Packet scheduling is a resource management algorithm used for allocating transmission opportunities and transmission formats to the users admitted to a shared medium. Thus, it is used in packed based mobile radio networks in combination with adaptive modulation and coding to maximise throughput by e.g. allocating transmission opportunities to the users in favourable channel conditions. In further explanations, it will be assumed that the scheduler operates on TTI basis.

Figure 1:
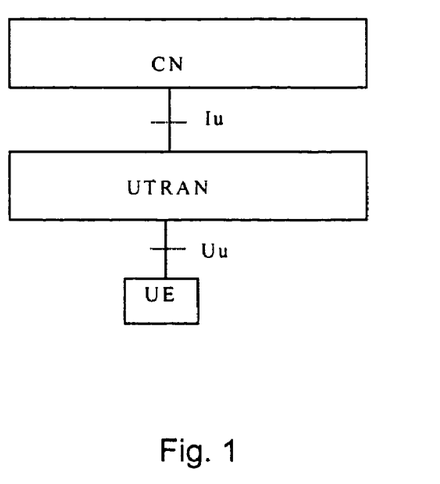
FIG. 1: High Level UMTS Architecture

The high level architecture of Universal Mobile Telecommunication System (UMTS) is shown in the FIG. 1. The network elements are functionally grouped into Core Network (CN), UMTS Terrestrial Radio Access Network (UTRAN) and User Equipment (UE). UTRAN is responsible for handling all radio-related functionality, while CN is responsible for routing calls and data connections to external networks. The interconnections of these network elements are defined by open interfaces as can be seen in the Figure. It should be noted that UMTS system is modular and it is therefore possible to have several network elements of the same type.

Figure 2:
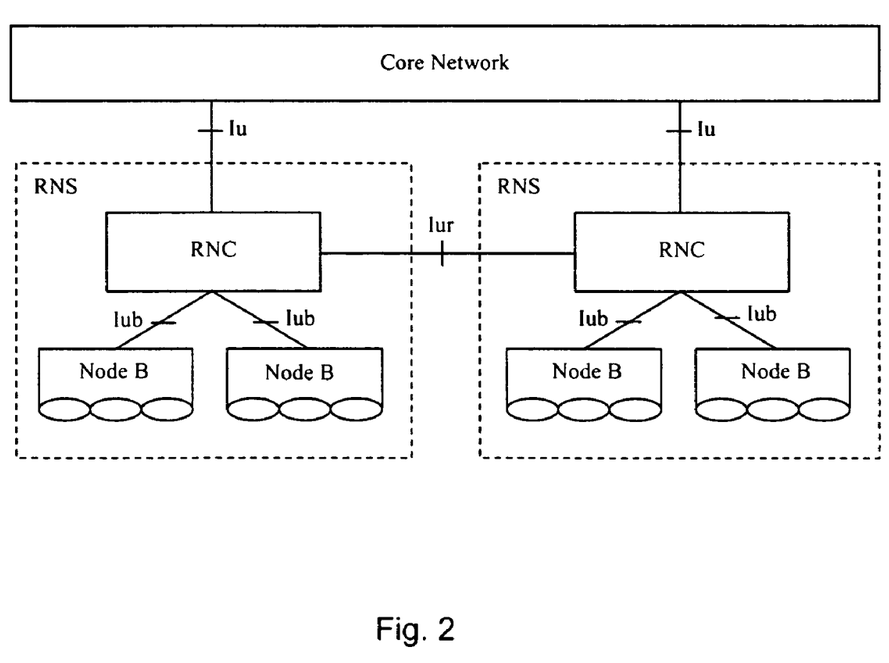
FIG. 2: Current Architecture of UTRAN
Figure 3:
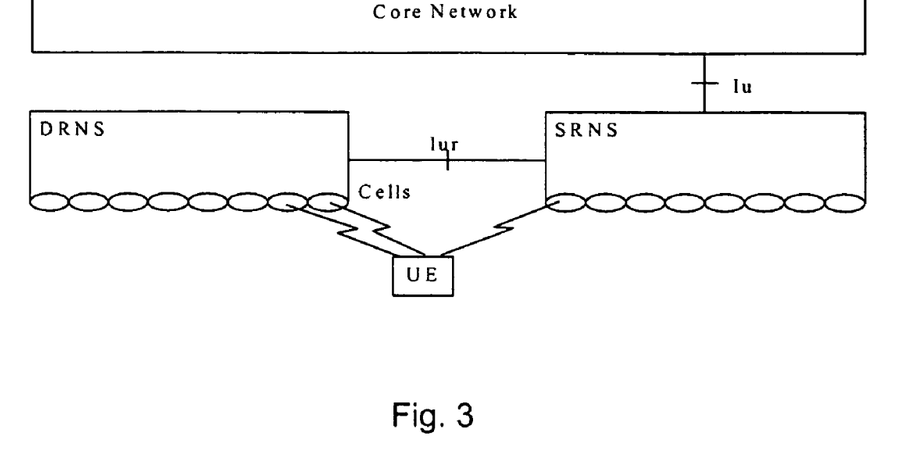
FIG. 3: Drift and Serving Radio Network Subsystem

FIG. 2 illustrates the current architecture of UTRAN. A number of Radio Network Controllers RNCs are connected to CN. Each RNC controls one or several base stations (Node Bs) which in turn communicate with the UEs. An RNC controlling several base stations is called Controlling RNC (C-RNC) for these base stations. A set of controlled base stations accompanied by their C-RNC is referred to as Radio Network Subsystem (RNS). For each connection between UE and the UTRAN, one RNS is the Serving RNS (S-RNS). It maintains the Iu connection with the Core Network (CN). When required, Drift RNSs (D-RNS) support the Serving RNS by providing radio resources as shown in FIG. 3. Respective RNCs are termed Serving RNC (S-RNC) and Drift RNC (D-RNC). In the following text it will be generally assumed that C-RNC and D-RNC are identical and in this case only abbreviations S-RNC or RNC will be used.

High Speed Downlink Packet Access (HSDPA) is a new technique that is standardised in UMTS. It shall provide higher data rates in the downlink by introducing enhancements at the Uu interface such as adaptive modulation and coding. HSDPA relies on hybrid Automatic Repeat Request protocol (HARQ) Type II/III, rapid selection of users which are active on the shared channel and adaptation of transmission format parameters according to the time varying channel conditions.

Figure 4:
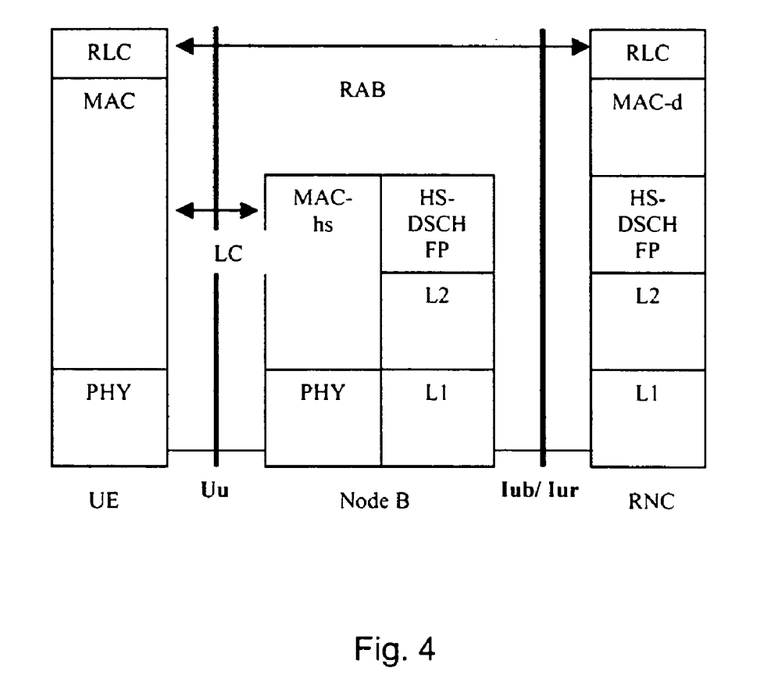
FIG. 4: User Plane Radio Interface Architecture of HSDPA

The User Plane Radio Interface Protocol Architecture of HSDPA is shown in FIG. 4 and described in 3GPP TSG RAN TR 25.308: "High Speed Downlink Packet Access (HSDPA): Overall Description Stage 2. V5.2.0, in particular Sections 5.1 and 6.1.4. HARQ protocol and scheduling function belong to the Medium Access Control MAC-hs sublayer which is distributed across Node B and UE. It should be noted that an SR ARQ protocol based on sliding window mechanisms could be also established between RNC and UE on the level of RLC sublayer in acknowledged mode. The service that is offered from RLC sublayer for point-to-point connection between CN and UE is referred to as Radio Access Bearer (RAB). Each RAB is subsequently mapped to a service offered from MAC layer. This service is referred to as Logical Channel (LC).

HS-DSCH FP (High Speed Downlink Shared Channel Frame Protocol) is responsible for flow control between Node B and RNC. It determines the capacity that can be granted to RNC for transmitting packets across transport network based on requests obtained from RNC. More specifically, the capacity is requested by CAPACITY REQUEST messages of HS-DSCH FP originating from S-RNC. The permission to transmit certain amount of data over certain period of time is granted by CAPACITY GRANT messages sent from Node B.

Parameters of the protocols are configured by signalling in the Control Plane. This signalling is governed by Radio Resource Control (RRC) protocol for the signalling between radio network (S-RNC and UE) and by application protocols, Node B Application Part (NBAP) on the Iub interface and RNSAP (Radio Network Subsystem Application Part) on the Iur interface.

Figure 5:
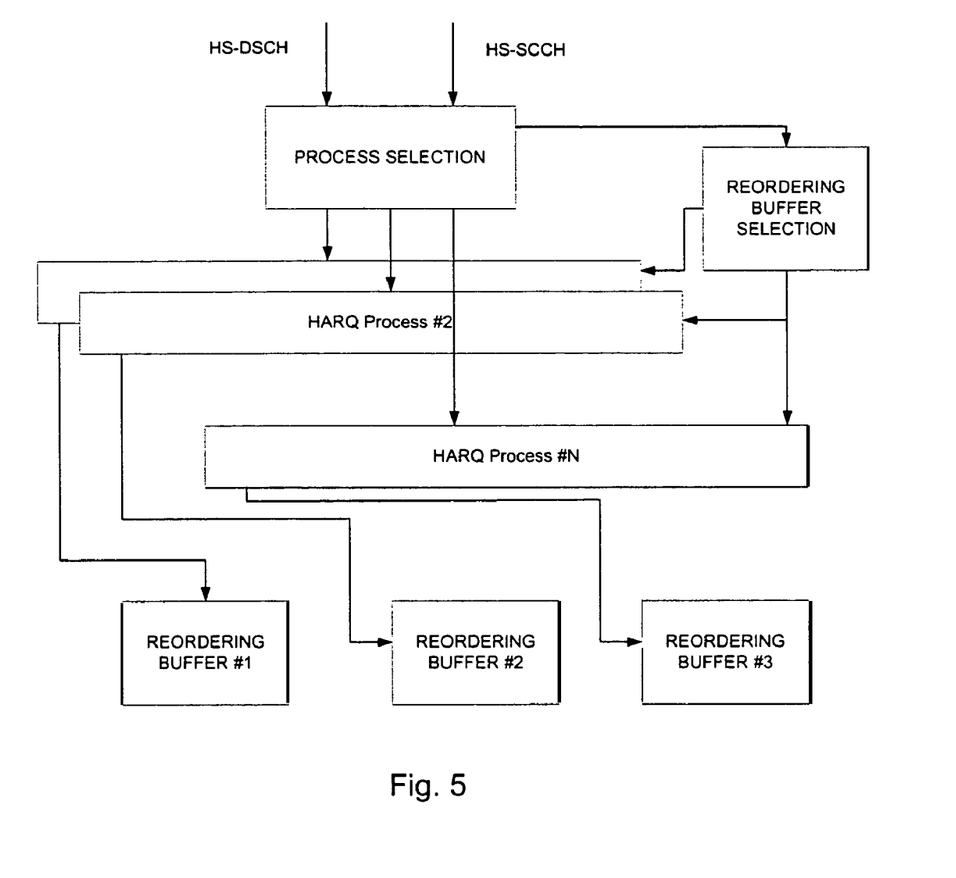
FIG. 5: UE HSDPA Architecture

The UE HSDPA Architecture is shown in FIG. 5. It can be noted that each HARQ process is assigned a certain amount of soft buffer memory for combining the bits of the packets from outstanding retransmissions. Once a packet is received successfully, it is forwarded to the reordering buffer providing the in-sequence delivery to RLC sublayer. According to the current architecture, reordering queue is tied to a specific priority.

It should be noted that the available soft buffer size depends on the UE radio access capability parameters. Processing time of UE for certain MCS level and minimum inter-TTI interval (minimum time between two successive scheduling instants) can also be considered as capability parameter. These are signalled from UE to the RNC by RRC protocol and further from RNC to the Node B.

Figure 6:
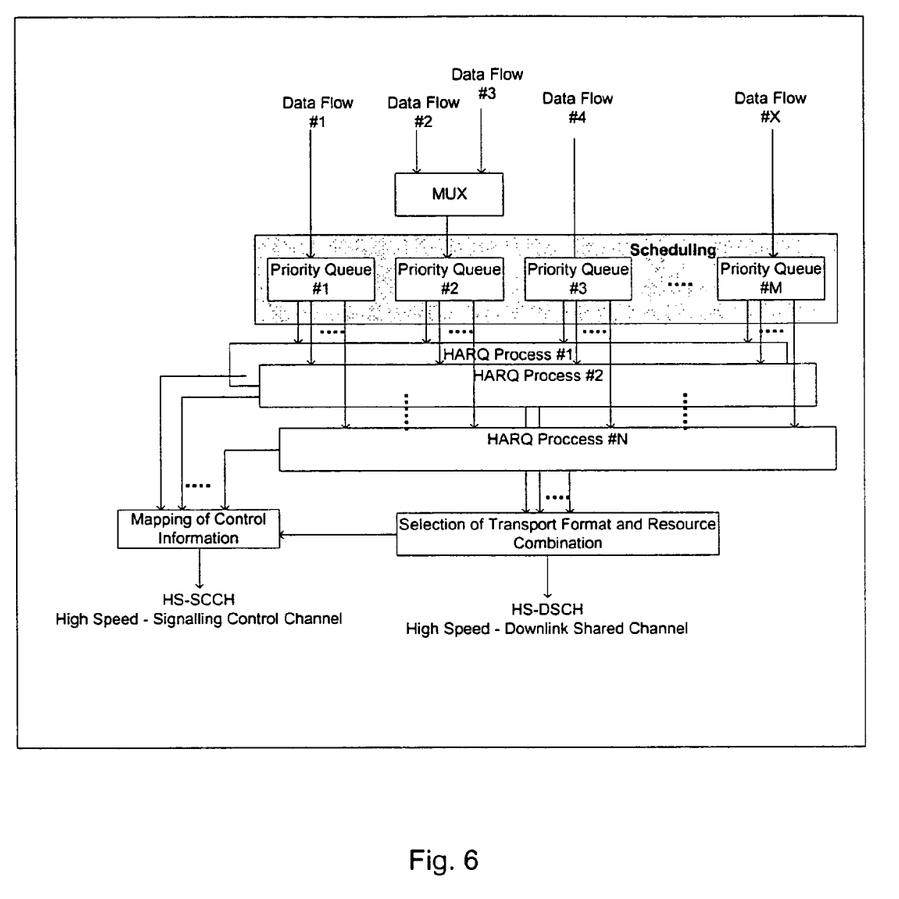
FIG. 6: Node B HSDPA Architecture

The architecture of a HSDPA Base Station is depicted in FIG. 6. There are X different data flows (logical channels) with data packets to be transmitted from the Node B to the UE. The set of HARQ transmitting and receiving entities, located in Node B and UE respectively, will be referred to as HARQ process. The maximum number of HARQ processes per UE is usually predefined. These data flows can have different QoS (e.g. delay and error requirements) and may require different configuration of HARQ instances. The scheduler will consider these parameters in allocating resources to different UEs. The scheduling function controls the allocation of shared channel (HS-DSCH: High Speed Downlink Shared Channel) to different users or to data flows of the same user, the current MCS level in one TTI and manages existing HARQ instances for each user. A data flow or even a particular packet of a data flow may have a different priority. Therefore the data packets can be queued in different priority queues. Different data flows with similar QoS requirements may also be multiplexed together (e.g. data flow #3 and #4). Besides the HS-DSCH that carries the data packets there is control data which is mapped onto the High Speed Shared Control Channel (HS-SCCH). This channel could carry data such as the HARQ process ID, the modulation scheme, code allocation, transport format etc. that is needed by the receiver to correctly receive, demodulate, combine and decode the packets.

It should be noted that there may be a number of packets waiting to be scheduled for the initial transmission to some of the available HARQ processes and also a number of packets pending for retransmissions. Further, the state of HARQ processes is distinguished by whether they are available for accepting packets for initial transmission or they still retransmit the pending packets that are to be combined in UE. In further explanations, it will be referred to this information as HARQ context or MAC-hs protocol context of a UE. In summary, HARQ context includes packets waiting for initial transmission, packets waiting for retransmission and the state of HARQ processes.

HS-PDSCH is transmitted with Associated Dedicated Physical Channel (A-DPCH) (see 3GPP TSG RAN WG1#28 "Further simulation results on HS-SCCH power control and HSDPA system throughput performance"). As a dedicated channel, A-DPCH is power controlled. Power control commands referring to the A-DPCH obtained from the UE can be used as an index for estimating channel quality. Another possibility to estimate the channel quality is by means of Channel Quality Indicator (CQI) obtained from uplink signalling.

The relation between Relation Between Radio Bearers (RBs), Logical Channels (LCs) and Transport Channels (TrChs) will be explained with a reference to the FIG. 7. It can be seen that MAC sublayer (see 3GPP TSG RAN TS 25.321: MAC Protocol Specification, V.5.3.0, section 4.2.4) consists of three entities: MAC-d (located in S-RNC), MAC-c/sh (located in D-RNC) and MAC-hs (located in Node B). It will be assumed that MAC-c/sh entity is bypassed without loosing generality of explanations. It should be noted that there exists a separate MAC-d entity for each user, while there can be more than one RLC entity per user. Each RLC RB is usually mapped to one DTCH (Dedicated Transport Channel). It may happen that RLC Control PDUs are mapped to a separate logical channel and that this channel is mapped to a DCH or HS-DSCH without multiplexing or multiplexed with logical channels of higher priority than that carrying RLC Data PDUs and subsequently mapped to HS-DSCH. It is noted that in both cases, RLC Control PDUs and RLC Data PDUs are mapped to different priority queues in the Node B. These DTCHs can be multiplexed in corresponding MAC-d entity as described below.

Figure 8:
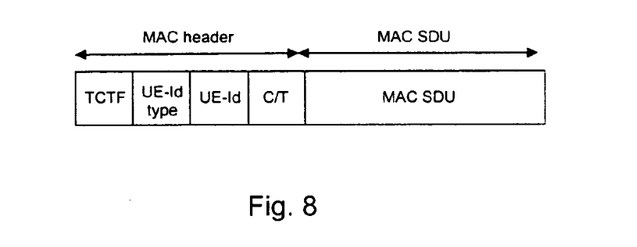
FIG. 8: Format of MAC PDU.
Figure 9:
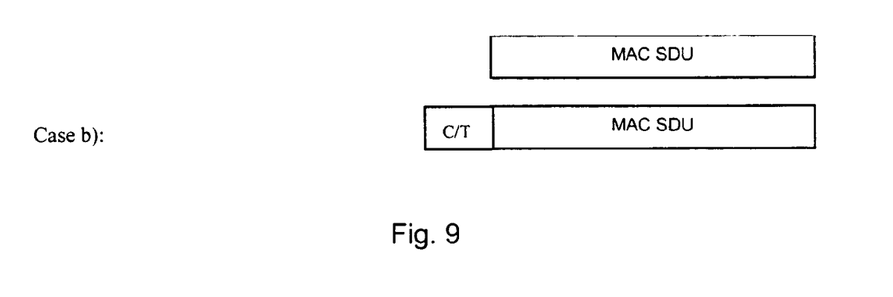
FIG. 9: Format of MAC PDU depending on logical channel multiplexing.

The general format of the MAC PDU is given in FIG. 8. It can be seen that MAC PDU consists of an optional header and MAC Service Data Unit (SDU). The contents and size of the header depends on the type of logical channel the transport channel it is mapped to. The size of MAC SDU is equal to the size of RLC PDU since RLC is the only upper instance on which segmentation/concatenation is performed. TCTF (Target channel type field) provides identification of the logical channel class on Format Access Channel (FACH) and Random Access Channel (RACH) transport channels. UE-Id type field ensures the correct interpretation of UE-Id field. UE-Id field provides an identification of an UE on common transport channels. C/T field provides an identification of logical channel instance when several logical channels are carried on a same transport channel. Therefore, if there is one-to-one correspondence between logical and transport channels the format is shown in FIG. 9, case a). However, if several DTCHs are mapped onto one DCH, MAC PDU has the format as in FIG. 9, case b). The size of the C/T field is limited to 4 bits and exact structure is given in Table 1.

TABLE 1

Structure of C/T field.

| C/T field | Designation |
| --- | --- |
| 0000 | Logical channel 1 |
| 0001 | Logical channel 2 |
| ... | ... |
| 1110 | Logical channel 15 |
| 1111 | Reserved (PDUs with this coding will be discarded by this version of the protocol) |

We refer to a set of MAC-d PDUs belonging to one DTCH (in case logical channel multiplexing is not used) or to a set of MAC-d PDUs belonging to several DTCHs (in case logical channel multiplexing is used) as MAC-d flow. This term corresponds to the term data flow used in the FIG. 6 and in the explanations throughout the previous subsection. One MAC-d flow is mapped to one priority queue in the Node B. Hence, if logical channel multiplexing is used, the packets from more than one RLC transmitting entity can be mapped to the same priority queue.

Figure 7:
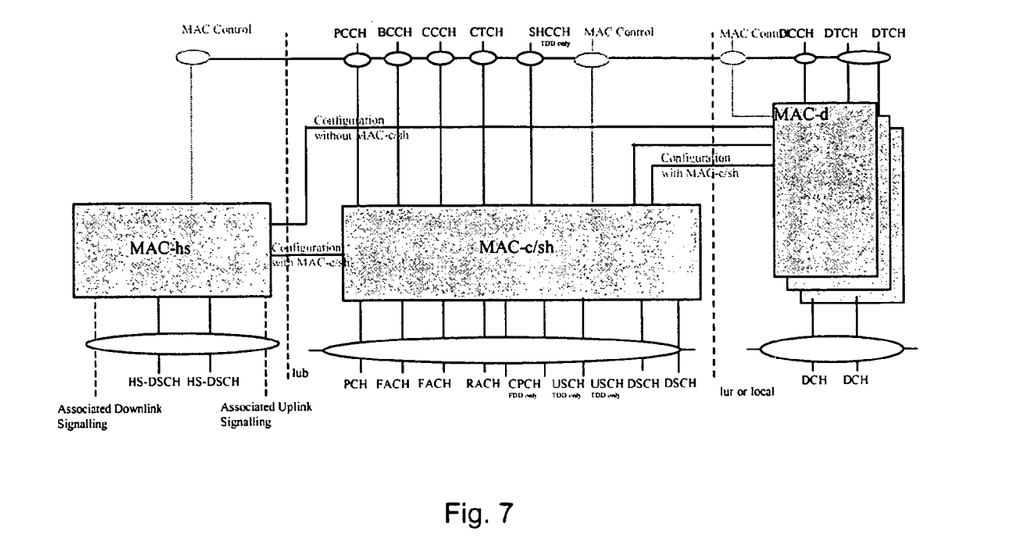
FIG. 7: UTRAN Side MAC Architecture.

As detailed further in the FIG. 7, MAC-d flows (i.e. the packets from the priority queues) are mapped to HS-DSCH TrCh.

HSDPA uplink signalling is carried out by means of dedicated uplink feedback channel transmitted by UE. CQI transmitted on this channel contains TFRC. Primary benefit of requesting a TFRC compared to signalling the channel state is that it can deal with different UE implementation resulting in different performance for a certain transport format at a specific channel state. A low TFRC value corresponds to bad channel conditions (lower level modulation, low code rate) and a high TFRC value maximises throughput for good channel conditions. The Node B does not necessarily have to follow the request of the UE. A UE uses certain criteria to determine which transmission format it is able to receive in given channel conditions. All the coded bits will be mapped onto the HSDPA Uplink Dedicated Physical Control Channel (UL-DPCCH). In UMTS FDD (Frequency Division Duplex), the HS-DSCH related uplink signalling can use DPCCH-HS with a Spreading Factor=256 that is code multiplexed with the existing dedicated uplink physical channels.

Figure 10:
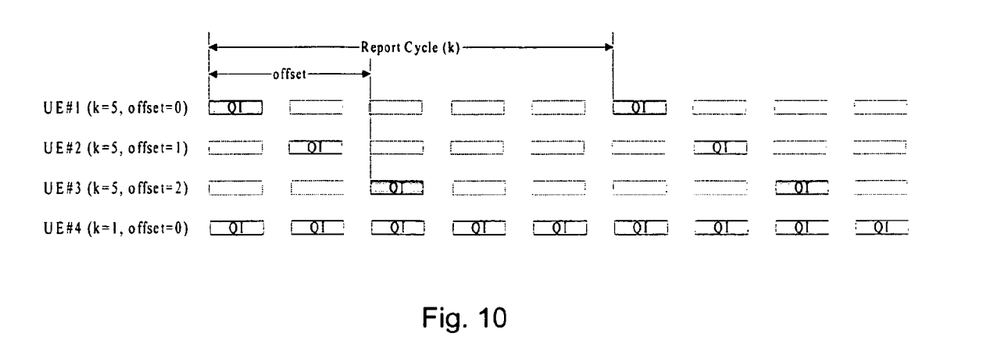
FIG. 10: Feedback measurement transmission timing

The transmission cycle and timing for channel quality indicator is determined by UTRAN and signalled by the control plane. Measurement feedback cycle k has a possible value of [1, 5, 10, 20, 40, 80] TTI. The larger the value of k the smaller is the signalling overhead in the uplink at the expense of decreased scheduling performance in the downlink. The set of values for measurement feedback offset/has yet to be determined. An illustration of feedback measurement transmission timing is given in FIG. 10.

This section will first introduce a number of definitions (see also 3GPP TSG RAN WG2: "Radio Resource management Strategies", V.4.0.0, sections 5.1.1 to 5.1.4.3). Some procedures related to mobility management will be explained afterwards.

Radio link is a logical association between single UE and a single UTRAN access point. Its physical realisation comprises radio bearer transmissions.

Handover is defined as transfer of UE connection from one radio bearer to another (hard handover) with a temporary break in connection or inclusion/exclusion of a radio bearer to/from UE connection so that UE is constantly connected to UTRAN (soft handover). Soft handover is specific for networks employing Code Division Multiple Access (CDMA) technology. Handover execution is controlled by S-RNC in mobile radio network.

Active Set comprises a set of radio links simultaneously involved in a specific communication service between UE and radio network.

Active set update procedure modifies the active set of the communication between UE and UTRAN. The procedure comprises three functions: radio link addition, radio link removal and combined radio link addition and removal. The maximum number of simultaneous radio links is set to eight. New radio links are added to the active set once the pilot signal strengths of respective base stations exceed certain threshold relative to the pilot signal of the strongest member within active set. A radio link is removed from the active set once the pilot signal strength of the respective base station exceeds certain threshold relative to the strongest member of the active set. Threshold for radio link addition is typically chosen to be higher than that for the radio link deletion. Hence, addition and removal events form a hysteresis with respect to pilot signal strengths. Pilot signal measurements are reported to the network (S-RNC) from UE by means of RRC signalling. Before sending measurement results, some filtering is usually performed to average out the fast fading. Typical filtering duration is about 200 ms and it contributes to handover delay. Based on measurement results, S-RNC may decide to trigger the execution of one of the functions of active set update procedure.

It is noted that HSDPA architecture is distributed in two different aspects: (1) downlink transmitting entities of ARQ protocols, RLC and MAC-hs, are located in S-RNC and Node B respectively and (2) radio resource management algorithms, handover control and packet scheduling are based on two independent measurements obtained from UE and are located in S-RNC and Node B respectively.

HS-PDSCH (High Speed Physical Downlink Shared channel) is a physical channel associated to HS-DSCH. The frame of HS-PDSCH (TTI of 2 ms) was chosen to be very short compared to that of dedicated channels (10 ms) to allow fast scheduling and link adaptation. Applying soft handover would cause problem in distributing scheduling responsibilities across all Node Bs of the active set and would require extremely tight timing to provide the scheduling decision to all members of the active set even if distribution of scheduling function were resolved. Therefore, soft handover is not supported for HS-PDSCH. Soft handover for A-DPCH is allowed which means it can be transmitted from more than one base station to a UE which combines obtained signals. Handover procedure related to HSDPA radio link is called serving HS-DSCH cell change (see 3GPP TSG RAN TR 25.308: "High Speed Downlink Packet Access (HSDPA): Overall Description Stage 2. V5.2.0, section 9).

Figure 11:
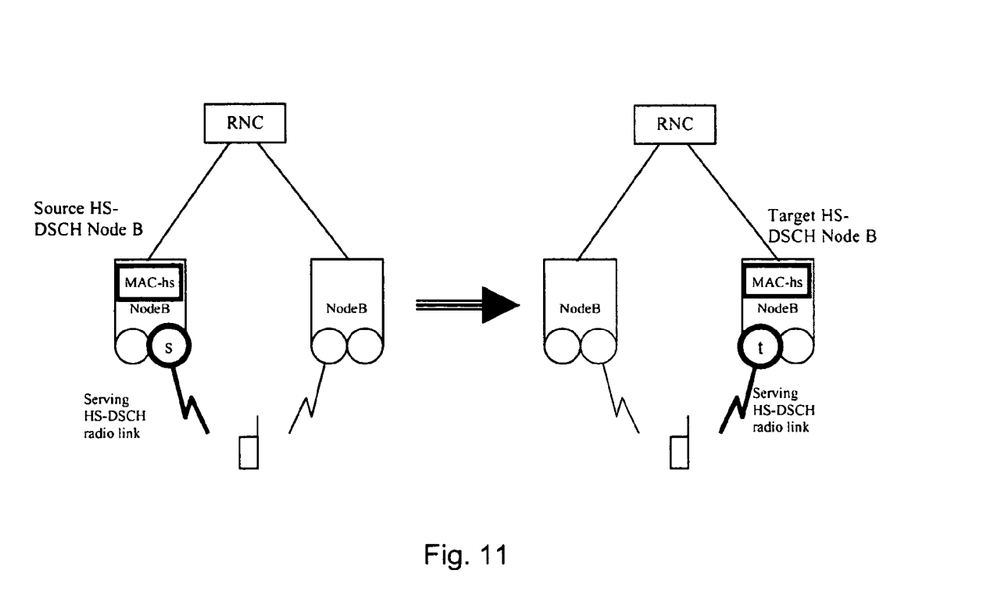
FIG. 11: Source and target HS-DSCH cell

During serving HS-DSCH cell change procedure, the role of serving HS-DSCH link is transferred from one radio link to another. The two cells involved in the procedure are denoted source HS-DSCH cell and target HS-DSCH cell (FIG. 11). The network-controlled serving HS-DSCH cell change is characterised in that the network makes the decision of the target cell. In UMTS, this decision process is currently carried out in S-RNC. Cell change procedure can be initiated by UE and it is then referred to as UE-controlled serving HS-DSCH change procedure. Further exposition will be limited to network-controlled procedure. Another criterion for categorising cell change procedure is the one with respect to the serving HS-DSCH Node B.

The Node B controlling the serving HS-DSCH cell for a specific UE is defined as the serving HS-DSCH Node B. Intra-Node B serving HS-DSCH cell change procedure is the cell change procedure with source and target HS-DSCH cells being controlled by the same Node B. In inter-Node B serving HS-DSCH cell change procedure, source and target HS-DSCH cells are controlled by different Node Bs.

Finally, it is noted that the present exposition will be limited to synchronised serving cell change procedures in which Node B and UE can simultaneously start transmitting/receiving signals after handover completion. Synchronisation between the UE and the network is maintained with activation timers which are set by RRC entity in S-RNC. Due to unknown delays over Iub/Iur interfaces, processing and protocol delays, a suitable margin is assumed when determining activation timer setting. The margin also contributes to handover delay.

It should be noted that executing an inter-Node B serving HS-DSCH cell change procedure also implies executing serving HS-DSCH Node B relocation procedure and this is where the problem of HARQ context relocation arises.

Figure 12:
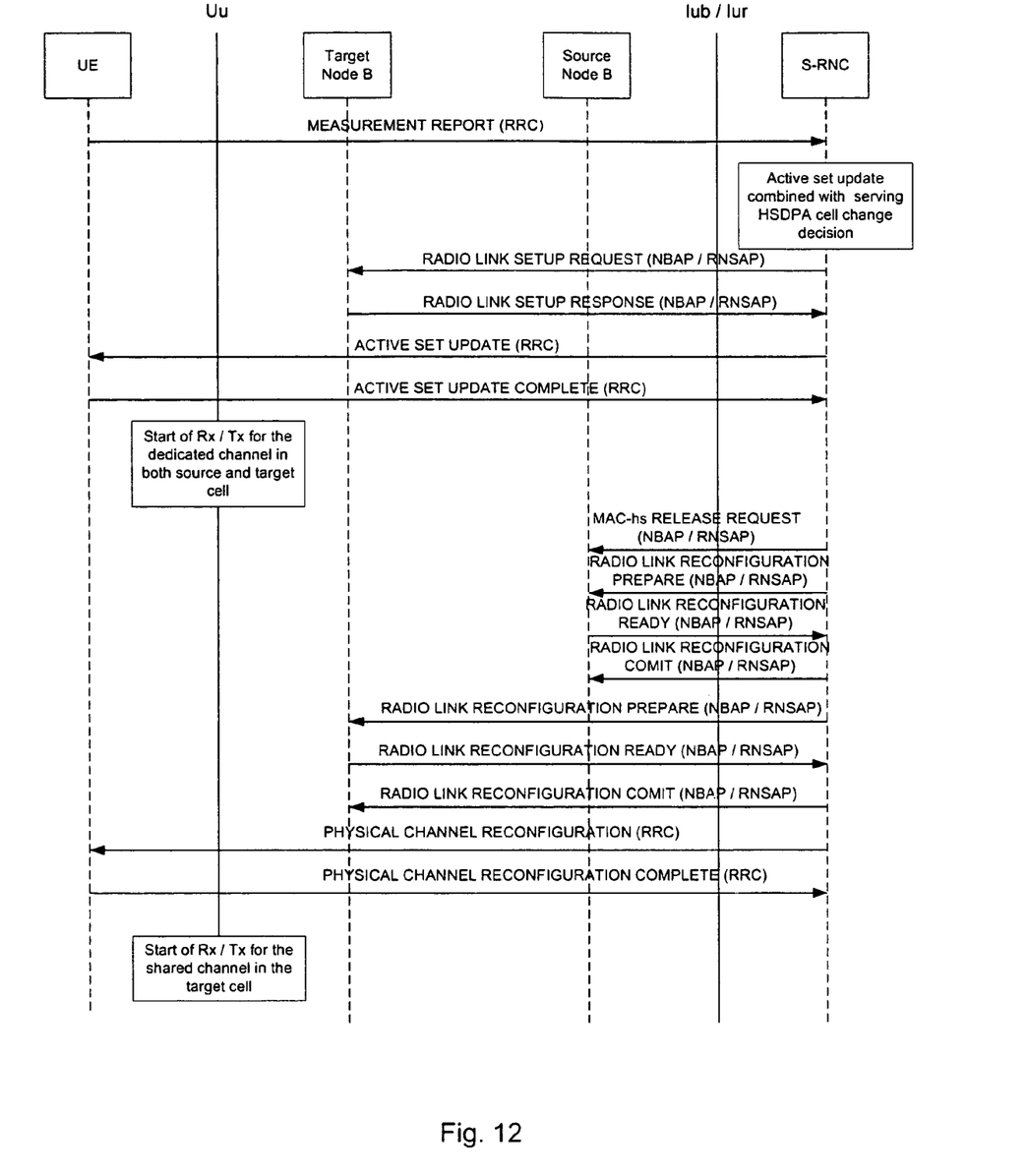
FIG. 12: Inter Node B serving HS-DSCH cell change signalling

A simplified example according to current standard of synchronised inter-Node B serving HS-DSCH cell change procedure is shown in FIG. 12. It is assumed that the decision on triggering active set update and cell change procedures is made in the S-RNC simultaneously.

It is assumed that the UE transmits a MEASUREMENT REPORT message to the S-RNC via RRC signalling. The S-RNC determines the need for the combined radio link addition and serving HS-DSCH cell change based on received measurement reports. As the first step, the SRNC initiates establishment of a new radio link for the dedicated channels to the target Node B by transmitting RADIO LINK SETUP REQUEST message via RNSAP/NBAP protocol. Target Node B confirms the establishment of a radio link by transmitting RADIO LINK SETUP RESPONSE message via RNSAP/NBAP protocol. RRC further transmits an ACTIVE SET UPDATE message to the UE via RRC protocol. The ACTIVE SET UPDATE message includes the necessary information for establishment of the dedicated physical channels in the added radio link (but not the HS-PDSCH). When the UE has added the new radio link it returns an ACTIVE SET UPDATE COMPLETE message via RRC protocol. This completes the addition of the new radio link for dedicated channels.

The S-RNC will now carry on with the next step of the procedure, which is the serving HS-DSCH cell change. For the synchronised serving HS-DSCH cell change, both the source and target Node Bs are first prepared for execution of the handover and the cell change at the activation time.

The S-RNC first exchanges signalling messages with source Node B (RADIO LINK RECONFIGURATION PREPARE, RADIO LINK RECONFIGURATION READY and RADIO LINK RECONFIGURATION COMIT via NBAP/RNSAP protocols). It should be noted that RADIO LINK RECONFIGURATION COMMIT message contains activation time information for source Node B. The same set of messages are subsequently exchanged with target Node B. The only difference in signalling intended for source and target Node B is that S-RNC informs source Node B to carry out the reset of MAC-hs entity by MAC-hs RELEASE REQUEST message of the NBAP/RNSAP protocol.

Finally, a PHYSICAL CHANNEL RECONFIGURATION is sent to the UE via RRC signalling. It contains activation time information and request for MAC-hs reset to the UE. When the communication is established, the UE responds with PHYSICAL CHANNEL RECONFIGURATION COMPLETE message.

The following summarises the operation of RLC protocol in the acknowledged mode (AM). RLC AM protocol (see 3GPP TSG RAN TS 25.322: RLC Protocol Specification, V.5.3.0) basically operates as a selective repeat sliding window ARQ protocol. It should be noted that the level of details in this and all paragraphs referring to RLC protocol is kept only to an extent sufficient to provide an understanding of the follow up explanations meaning that the descriptions of some state variables, timers and parameters may be shortened or even omitted.

RLC Protocol Data Units (PDUs)

RLC PDUs for RLC configured in acknowledged mode are divided into RLC acknowledged mode data PDUs (RLC AM PDUs) and RLC acknowledged mode control PDUs. The former are used for transferring the packets from higher layers, while the latter are used for providing the feedback necessary for protocol operation. Control PDUs may consists of several super fields (SUFIs) essentially representing the concatenation of control packets with different information.

RLC AM transmitting entity encompasses segmentation function. Segmentation is carried out so that payload size is always equal to a number of octets.

RLC State Variables

The RLC maintains the following state variables at the transmitter. The values of these variables are dynamically updated during the operation.
a) VT(S)—Send State Variable.
   The sequence number of the next PDU to be transmitted for the first time (i.e. excluding retransmission).
b) VT(A)—Acknowledge state variable.
   The sequence number of the next in-sequence PDU expected to be acknowledged, which forms the lower edge of the window of acceptable acknowledgements.
c) VT(DAT).
   This state variable counts the number of times a PDU has been transmitted. There is one VT(DAT) for each PDU and it is incremented each time the PDU is transmitted.
d) VT(MS)—Maximum Send state variable.
   The sequence number of the first PDU not allowed by the peer receiver [i.e. the receiver will allow up to VT(MS)−1], VT(MS)=VT(A)+VT(WS). This value represents the upper edge of the transmit window.
e) VT(RST)—Reset state variable.
   It is used to count the number of times a RESET PDU is transmitted. VT(RST) is incremented with 1 each time a RESET PDU is transmitted. VT(RST) is reset only upon the reception of a RESET ACK PDU, i.e. VT(RST) is not reset when an RLC reset occurs which was initiated from the peer RLC entity.
f) VT(MRW)—MRW Command Send state variable.
   It is used to count the number of times a MRW command is transmitted. VT(MRW) is incremented with 1 each time an MRW command is transmitted.
g) VT(WS)—Transmitter Window Size state variable.

The RLC maintains the following state variables at the receiver:
a) VR(R)—Receive State variable.
   The sequence number of the next in-sequence PDU expected to be received.
b) VR(H)—Highest expected state variable.
   The sequence number of the highest expected PDU. This state variable is set equal to SN+1 only when a new PDU is received with VR(MR)>SN≧VR(H). The initial value of this variable is 0.
c) VR(MR)—Maximum acceptable receive state variable.
   The sequence number of the first PDU not allowed by the receiver [i.e. the receiver will allow up to VR(MR)−1], VR(MR)=VR(R)+Configured_Rx_Window_Size. The receiver shall discard PDUs with SN≧VR(MR).
d) VR(US)—Receiver Send Sequence state variable.
   The sequence number of the next PDU to be received. It shall set equal to SN+1 upon reception of a PDU. The initial value of this variable is 0.

RLC Timers

The values of timers are set by Control Plane (RRC).
a) Timer_Discard.
   This timer is used for the SDU discard function. In the transmitter, the timer is activated upon reception of an SDU from upper layer. One timer is used for each SDU that is received from upper layer. For UM/Tr, if the timer expires before the SDU is submitted to a lower layer, "SDU discard without explicit signalling" shall be started. For AM, if the timer expires before the SDU is acknowledged, "SDU discard with explicit signalling" shall be started.

b) Timer_Status_Prohibit.

This timer is only used when the STATUS prohibit function is used. It prohibits the receiving side from sending status reports containing any of the status reports. The timer is started when the successful or unsuccessful transmission of the last STATUS PDU in a status report is indicated by lower layer (in UE) or the last STATUS PDU in a status report is submitted to lower layer (in UTRAN).

c) Timer_Status_Periodic

This timer is only used when timer based status report sending is used. The timer is started when the RLC entity is created. Each time the timer expires the transmission of a status report is triggered and the timer is restarted. The value of the timer is signalled by upper layers. This timer can be blocked by upper layers. In this case, the timer shall not be active. The timer shall be reset and restarted when it is unblocked by upper layers.

c) Timer_Poll

This timer is only used when the poll timer trigger is used. It is started when the successful or unsuccessful transmission of a PDU containing a poll is indicated by lower layer (in UE) or a PDU containing a poll is submitted to lower layer (in UTRAN). The timer is stopped when receiving a STATUS PDU that contains an acknowledgement of all AMD PDUs with SN up to and including VT(S)−1 at the time the poll was submitted to lower layer, or when a negative acknowledgement of the same PDU is received.

d) Timer_Poll_Periodic

This timer is only used when the timer based polling is used. The timer is started when the RLC entity is created. Each time the timer expires, the timer is restarted and a poll is triggered (either by the transmission of a PDU which was not yet sent, or by a retransmission). If there is no PDU to be transmitted and all PDUs have already been acknowledged, a poll shall not be triggered and the timer shall only be restarted.

e) Timer_RST

This timer is used to detect the loss of RESET ACK PDU from the peer RLC entity. This timer is started when the successful or unsuccessful transmission of a RESET PDU is indicated by lower layer (in UE) or a RESET PDU is submitted to lower layer (in UTRAN). It will only be stopped upon reception of RESET ACK PDU, i.e. this timer is not stopped when an RLC reset occurs which was initiated from the peer RLC entity. If it expires, RESET PDU will be retransmitted.

f) Timer_MRW

This timer is used as part of the Move Receiving Window protocol. It is used to trigger the retransmission of a status report containing an MRW SUFI field. The timer is started when the successful or unsuccessful transmission of a STATUS PDU containing the MRW SUFI is indicated by lower layer (in UE) or a STATUS PDU containing the MRW SUFI is submitted to lower layer (in UTRAN). Each time the timer expires the MRW SUFI is retransmitted and the timer is restarted (at the time specified above). It shall be stopped when one of the termination criteria for the SDU discard is fulfilled.

RLC Parameters

The values of parameters are set by Control Plane (RRC).

a) MaxDAT.

It is the maximum value for the number of retransmissions of a PDU. This parameter is an upper limit of counter VT(DAT). When the value of VT(DAT) comes to MaxDAT, either RLC RESET procedure or SDU discard procedure shall be initiated according to configuration by upper layer.

b) MaxMRW.

It is the maximum value for the number of retransmissions of a MRW command. This parameter is an upper limit of counter VT(MRW). When the value of VT(MRW) comes to MaxMRW, RLC RESET procedure shall be initiated.

c) Configured_Tx_Window_Size.

The maximum allowed transmitter window size.

d) Configured_Rx_Window_Size.

The allowed receiver window size.

Figure 13:
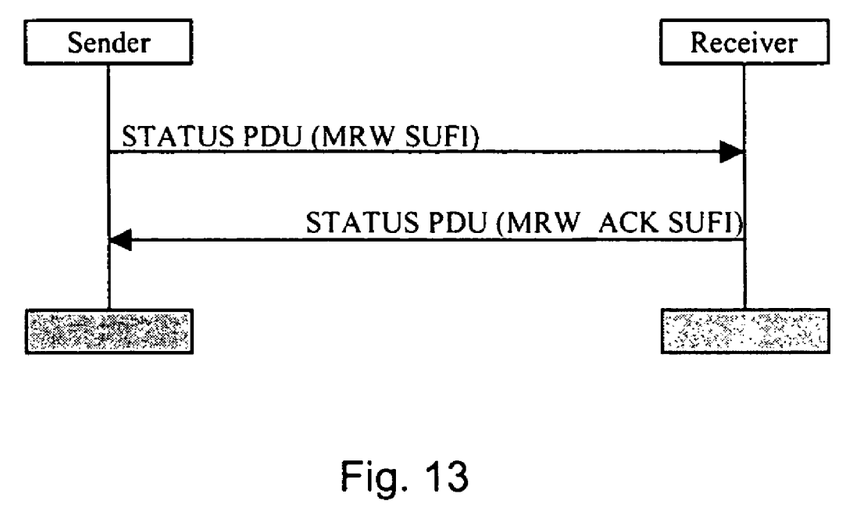
FIG. 13: SDU Discard Procedure with Explicit Signalling.

An SDU can be discarded with explicit signalling when MaxDAT number of retransmissions is reached (FIG. 13) or the transmission time exceeds a predefined value (Timer_Discard) for an SDU in acknowledged mode RLC. Move Receiving Window (MRW) command is sent to the receiver so that AMD PDUs carrying discarded SDU are discarded in the receiver and the receiver window is updated accordingly. If Send MRW is not configured and no segments of an SDU were submitted to a lower layer, the SDU is simply discarded in the transmitter without notification to the receiver. If Send MRW is configured, a Move Receiving Window request shall be sent to the receiver even if no segments of the SDU were submitted to a lower layer. The MRW command is defined as a super-field in the RLC STATUS PDU, and can be piggybacked to status information of transmissions in the opposite direction.

The RLC transmitting entity initiates this procedure when any of the following conditions are fulfilled:

1) Timer based SDU discard with explicit signalling is used, Timer_Discard expires for an SDU, and one or more segments of the SDU have been submitted to a lower layer.

2) SDU discard after MaxDAT number of retransmissions is used, and MaxDAT number of retransmissions is reached for an SDU.

The sender shall discard all PDUs that contain segments of the associated SDUs. If the concatenation function is active, PDUs carrying segments of other SDUs that have not timed out shall not be discarded. VT(A) and VT(S) state variables are updated accordingly.

The RLC transmitting entity shall start timer Timer_MRW. Upon expiry of this timer and without receiving MRW_ACK super field, RLC transmitting entity shall retransmit MRW super field up to MaxMRW times. VT(MRW) state variable is updated accordingly.

If a new SDU discard procedure is triggered when Timer_MRW is running, no new MRW SUFIs shall be sent before the current SDU discard procedure is terminated by one of the termination criteria (reception of MRW ACK super field or reaching MaxMRW number of retransmissions of MRW super field).

Figure 14:
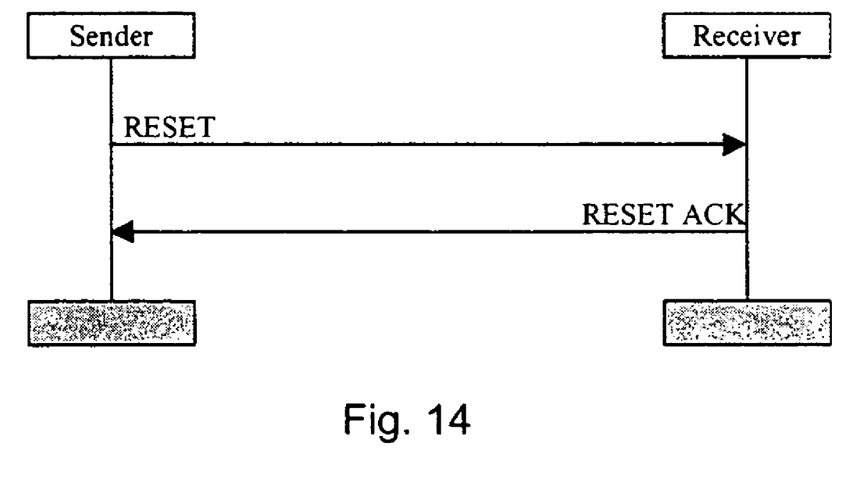
FIG. 14: RLC Reset procedure signalling between sending and receiving RLC entities

A RLC Reset Procedure (see for details, e.g. 3GPP TSG RAN TS 25.322: RLC Protocol Specification, V.5.3.0, section 11.4, JP 200202714; WO 02063913) is initiated when the protocol error occurs. It is used to reset peer RLC entities when operating in the acknowledged mode (AM). RLC reset procedure is carried out by exchanging RLC RESET and RLC RESET ACK control PDUs between transmitting and receiving RLC entities as detailed in the FIG. 14. Together with the reset procedure, RLC entities shall discard invalid PDUs and RLC entity initiating reset procedure shall notify upper layer on unrecoverable error occurrence. Following events are considered as unrecoverable protocol errors.

a) If the RLC entity receives a PDU including "erroneous Sequence Number", state variables between peer entities may be inconsistent. Following shows "erroneous Sequence Number" examples:

Each Sequence Number of missing Protocol Data Unit (PDU) informed by receiver feedback is not within the interval between "Acknowledge state variable(VT(A))" and "Send state variable(VT(S))−1".

The sequence number of last acknowledged PDU is not within the interval between "Acknowledge state variable(VT(A))" and "Send state variable(VT(S))−1".

b) Inconsistent status indication of a PDU: If a received STATUS PDU indicates different status for the same PDU, then the transmitter shall discard the STATUS PDU and initiate RESET procedure.

c) Invalid PDU format: If the RLC PDU format contains reserved or invalid values, the RLC PDU shall be discarded and RESET procedure should be initiated.

d) When discarding an RLC SDU and if the number of retransmissions of an MRW command (i.e. VT(MRW)) reaches MaxMRW, an error indication shall be passed to upper layers and RESET procedure shall be performed.

e) Reset procedure shall be initiated after MaxDAT number of retransmissions of an AMD PDU if no_discard after MaxDAT retransmissions is used.

It may be noted that the last case is rare since HARQ retransmission protocol implemented in MAC-hs is quite effective and MaxDAT can be set equal to arbitrarily high constant. The probability of this case is somewhat higher only after executing inter Node B serving cell change procedure. Other cases, however, may occur relatively more frequently.

An RLC entity receiving a RESET PDU, has to (among other things)

reset the transmission window [VT(A), VT(MS)], and the receiving window [VR(R), VR(MR)] to the initial values, i.e. after RESET, VT(A)=0, VT(MS)=Configured_Tx_Window_size, VR(R)=0, VR(MR)=Configured_Rx_Window_Size, and reset other state variables (except for VT(RST))

stop all the timers except Timer_RST, Timer_Discard, Timer_Poll_Periodic and Timer_Status_Periodic;

discard all RLC PDUs in the receiving side of the AM RLC entity;

discard all RLC SDUs that were transmitted before the reset in the transmitting side of—the AM RLC entity.

An RLC entity sending an RLC RESET PDU upon receiving RLC RESET ACK PDU has to:

reset the transmission window [VT(A), VT(MS)], and the receiving window [VR(R), VR(MR)] to the initial values, i.e. after RESET, VT(A)=0, VT(MS)=Configured_Tx_Window_size, VR(R)=0, VR(MR)=Configured_Rx_Window_Size, and reset other state variables.

stop all the timers except Timer_Discard, Timer_Poll_Periodic and Timer_Status_Periodic;

discard all RLC PDUs in the receiving side of the AM RLC entity;

discard all RLC SDUs that were transmitted before the reset in the transmitting side of the AM RLC entity.

Timer_Status_Prohibit shall only be used when so configured by upper layers. It is meant to prohibit the receiver from sending consecutive acknowledgement status reports except for the generation of a status report triggered by MAC-hs reset.

From the time an acknowledgement status report is triggered until the Timer_Status_Prohibit timer expires, acknowledgement is prohibited. If another such status report is triggered by others than an indication from lower layers following a MAC-hs reset while acknowledgement is prohibited, its transmission shall be delayed until the timer expires. The status report may be updated during this time. If a status report is triggered by an indication from lower layers following a MAC-hs reset, a status report shall be transmitted immediately and the timer shall be restarted.

This procedure is particularly useful during inter Node B serving cell change provided that RLC sublayer is configured in the acknowledged mode (AM). As detailed in the section on the synchronised inter Node B serving cell change procedure, MAC-hs entities in both source Node B and UE are reset thus leading to the loss of HARQ protocol context. The packets lost during MAC-hs reset from the Node B buffer have to be retransmitted by RLC as soon as possible. Hence, status report is unconditionally triggered following MAC-hs reset thus requesting RLC retransmissions.

We conclude that there exists a mechanism for synchronising MAC-hs reset procedure to RLC operation. However, as detailed in the previous subsection, RLC reset procedure may also occur completely independently of MAC-hs operation.

Figure 15:
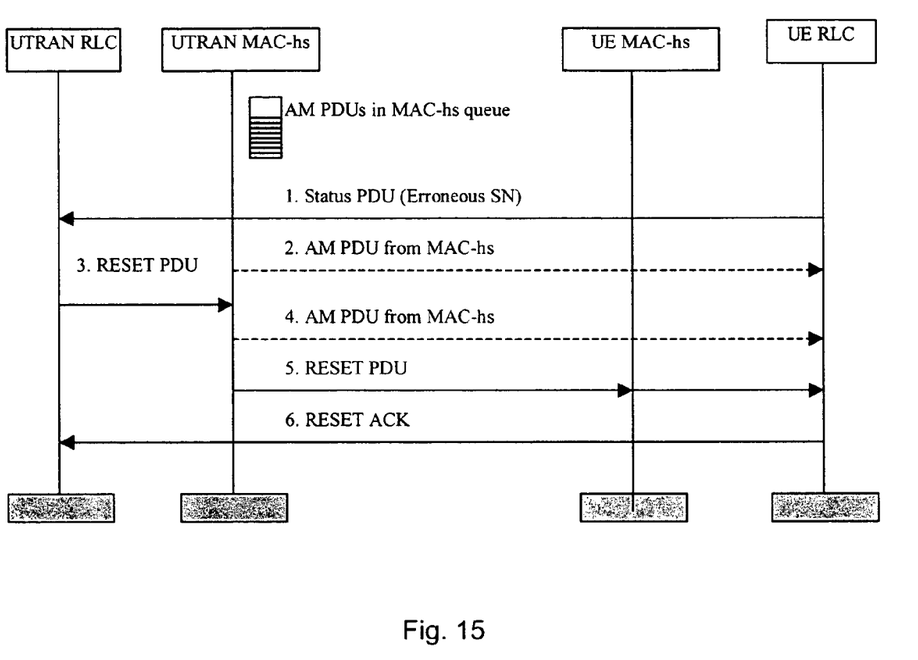
FIG. 15: RLC AM reset procedure without synchronisation with MAC-hs.

It was described above there is a connection between MAC-hs reset and Timer_Status_prohibit handling of RLC. However, there is a coordination missing in another case: RLC protocol has been reset and MAC-hs continues normal operation. Given this assumption, the following scenario is possible (FIG. 15).

1. A STATUS PDU is received in the UTRAN RLC. This STATUS PDU contains an erroneous SN as specified in the subsection on RLC reset procedure. This assumption for the cause of reset does not decrease the generality of exposition. RLC AM reset procedure can be invoked by any other reason. Thus the UTRAN RLC generates a RESET PDU to be transmitted to its peer on the UE side. At this point in time no AM PDUs should be transmitted because an inconsistency between the peer RLCs is expected.

2. The potential inconsistency between the RLC entities is unknown in MAC-hs. Therefore the scheduler may still decide to transmit data to the UE. These data are likely to be discarded in the UE.

3. The UTRAN RLC sends a RESET PDU to MAC-hs.

4. The MAC-hs does not know that the received PDU is a RESET PDU. Therefore, MAC-hs continues transmitting MAC-hs PDUs.

5. The RESET is received on the UE side.

6. The RESET ACK is sent to UTRAN thus completing the RESET procedure.

This example shows that in the event of an RLC reset a number of MAC-hs PDUs may be transmitted over the air interface that cannot be utilised by the UE. Hence, radio resources are not exploited efficiently. As noted in the subsection explaining the relation between Radio Bearers (RBs), Logical Channels (LCs) and Transport Channels (TrChs), MAC-d flows corresponding to RLC control and data PDUs are mapped to different priority queues. Therefore, the total amount of MAC-hs PDUs that are transmitted in vain depends essentially on the scheduling algorithm and priorities assigned to the respective queues. In the following the influence of erroneously delivered RLC PDUs on RLC AM operation at UE side is examined.

After the RESET PDU has been received by RLC entity in the UE, two cases can be distinguished with respect to the sequence numbers of "old PDUs" that remained in the Node B Priority Queue after initiating the reset procedure.

a) All old PDUs have sequence numbers which are not within initialised reception window at the UE ([0, Configured Rx_Window_Size])

b) Some or all of old PDUs have sequence numbers which are inside initialised reception window at the UE ([0, Configured_Rx_Window_Size])

In the first case, no malfunctions will ensue, because all old PDUs received after initiation of RLC reset procedure will be discarded.

In the second case, old PDUs will be treated as having been sent from the peer RLC entity on the network side. Consequently, all "real" RLC PDUs sent after reset procedure will be discarded as duplicate PDUs. Moreover, after concatenation, old PDUs will be delivered to higher layer causing possibly further malfunction. Finally, receiving RLC entity will send a control PDU to the network containing feedback reporting for received old PDUs, while new PDUs with corresponding sequence numbers have not yet been sent. This will in turn trigger a new RLC reset procedure due to "erroneous sequence numbers" of control PDUs as explained in the subsection RLC Reset Procedure. It is noted that the probability of old PDUs having sequence numbers inside initialised reception window increases with increasing Configured_Rx_Window_Size parameter.

A special case for b) is when one of old PDUs is a control PDU with MRW SUFI. In this case even an additional loss of packets in receiving RLC entity may ensue. It should also be noted that certain inefficiencies are caused in the operation of MAC-hs at the UE side when delivering MAC-hs packets with old RLC PDUs.

As a result, firstly, soft buffer and available HARQ processes are not utilised efficiently. These resources could have been used for receiving the packets from MAC-d flows that are not connected to reset RLC AM entities. Secondly, old packets consume unnecessarily some space in the reordering buffer at the receiver.

To conclude, RLC AM reset, when not synchronised to MAC-hs operation, may cause following undesirable consequences, such as inefficient utilisation of radio resources, malfunctions in operation of RLC sublayer, malfunctions in operation of higher layer, loss of RLC AM PDUs and inefficient utilisation of HARQ hardware on UE side.

The object of the present invention is to provide a method to overcome the above-mentioned deficiencies, in particular, to provide an effective utilization of the radio resources and avoid malfunctions in the operation of the retransmission protocol and losses of data.

This object is solved by a method defined in claim 1. Preferred embodiments of the method are subject to various dependent claims.

Reset of Radio Link Control protocol (RLC) is typically initiated when some irregular conditions are identified. The invention is based on the consideration that this operation is not synchronised to the operation of another retransmission protocol that may exist closer to air interface to eliminate unnecessary delay. Continuation of operation after resetting only RLC may cause irregular conditions again and repetitive resets of RLC. The present invention provides a method aiming at coordinating reset procedures and operation of retransmission protocols in order to achieve a synchronisation of the RLC reset procedure and MAC-hs operation to avoid the adverse implications mentioned above. According to a preferred embodiment, this synchronisation should be carried out in Node B and UE separately.

According to an advantageous embodiment, synchronising means that old RLC PDUs remaining in a priority queue should not be transmitted from Node B once RLC AM reset procedure has been invoked. Furthermore, it is preferred that all MAC-hs PDUs containing old RLC PDUs and remaining in UE reordering buffer and soft buffer are flushed (related HARQ processes should be reset) once RLC AM reset procedure has been invoked.

The invention is particularly applicable to HSDPA. Although most of the presented embodiments refer to HSDPA, the invention is not restricted to this system. Therefore the data transmission does not necessarily depend on a particular radio access scheme. The present invention will be explained in the following in further detail with reference to the accompanying drawings, which the figures illustrate the following:

As noted in the section above, once a reset procedure is triggered in RLC sending entity (located in the SRNC for downlink transmission), the operation of MAC-hs entities in both Node B and UE shall be synchronised.

First, synchronisation of reset in Node B will be explained. This can be achieved, for instance, by a MAC-hs RELEASE/REQUEST message of the RNSAP/NBAP protocols, which are sent from SRNC to Node B to initiate MAC-hs reset in the Node B.

Next, synchronisation of reset in UE is illustrated. There are several ways of synchronising reset in the UE. As a first example, a PHYSICAL CHANNEL RECONFIGURATION message shall be sent from RRC entity in the SRNC to RRC entity in the UE to initiate MAC-hs reset in the UE (see also FIG. 9). As a second possibility, for carrying out the RLC reset procedure, RESET and RESET ACK RLC PDUs are exchanged between sending and receiving RLC entity (see FIG. 14). To synchronise the reset of RLC to the reset of receiving MAC-hs entity, an intralayer primitive (Reset Req) can be sent from receiving RLC entity to the receiving MAC-hs entity. It is noted that this option requires less signalling, but an additional intralayer primitive has to be introduced.

As noted in the section explaining the relation of Radio Bearers (RBs), Logical Channels (LCs) and Transport Channels (TrChs), the packets belonging to more than one RB can be buffered in the single priority queue in Node B and reordered in the single reordering buffer in UE. Hence, flushing the priority queue or reordering buffer of MAC-hs after resetting only one RLC AM entity would lead to the loss of those MAC-hs PDUs which are, due to logical channel multiplexing, associated with other RLC AM entities. We therefore propose a way of partly flushing the contents of the buffer.

As explained in FIG. 8 and Table 1, C/T field exists in the header of MAC PDU if logical channel multiplexing is applied. There are two ways of partially flushing the contents of Priority Queue/Reordering Buffer/Soft Buffer.

Figure 17:
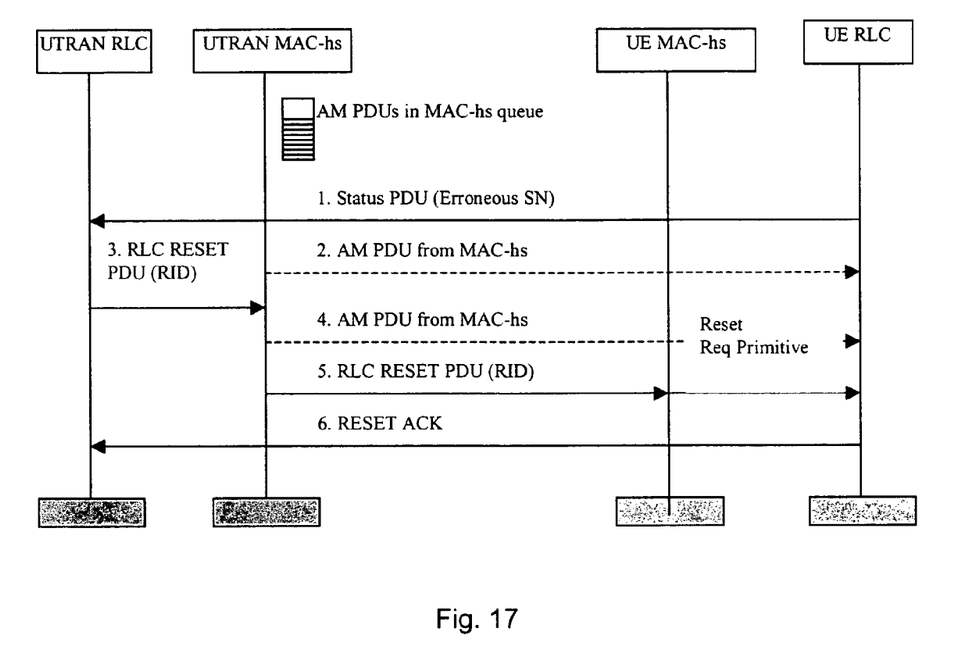
FIG. 17: RLC AM Reset procedure with synchronisation with MAC-hs.

A first possibility is using in-band identification of RLC Reset PDU encapsulated within MAC PDU. This solution is illustrated in FIG. 17 and it is applicable when DTCH carrying RLC control PDUs is mapped to HS-DSCH with high priority or when a single DTCH mapped to HS-DSCH is used for both RLC control and RLC data PDUs.

To distinguish the RLC RESET PDU (FIG. 14) in Node B, we propose using the reserved value (1111—Table 1) in the C/T field if logical channel multiplexing is applied to indicate RLC reset. Additionally, another 4 bit field called Reset ID (RID, FIG. 16) will contain information on logical channel being tied to a particular RB. To reduce the overhead, the field should be only appended if logical channel multiplexing is enabled. If the field is not present, the whole priority queue can be flushed.

Figure 16:
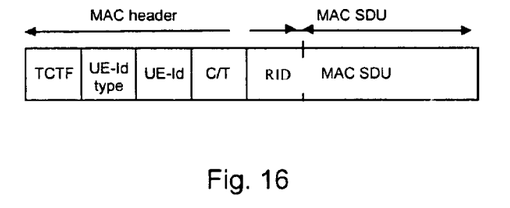
FIG. 16: Proposed MAC PDU format.

The RID field could be used on UE side in an analogous manner to decide whether to flush complete Reordering Buffer or just part of it. We note that logical channel identity field is a part of RB mapping info IE that is sent from SRNC to UE by means of RRC signalling. Therefore this field can also be used in the UE instead of RID field. The Reset Req primitive between RLC and MAC-hs entities should contain one of these fields.

A second option is the usage of signalling for synchronising RLC reset when logical channel multiplexing is enabled would require introducing new information element (IE) in MAC-hs RELEASE/REQUEST message This element would contain logical channel identification analogous to RID field.

Finally, it is noted that some of MAC-hs PDUs may contain MAC-d PDUs from different RBs. They should also be flushed in case any RLC entity corresponding to these RBs has been reset. The lost RLC AM PDUs will be retransmitted on RLC AM level but this will not cause inefficient use of radio resources.

Based on the explanations given above, the benefits of the unveiled invention are a more efficient utilisation of radio resources, especially HARQ hardware on UE side and to avoid malfunctions in the operation of RLC (this benefit increases with increasing Configured_Tx_Window_Size parameter which is analogous to increasing available data rates), and higher layers. Finally, loss of RLC PDUs belonging to the same RB is also avoided.

Finally, it is noted that the feasibility study for Enhanced Uplink Packet Access is being considered in 3GPP (TSG RAN TR 25.896 V.0.3.0). The transport channel used in this case is denoted as Enhanced Uplink Dedicated Channel (EUDCH). HARQ method where erroneous packets are stored for subsequent combining may be also applied to provide time diversity for uplink transmissions. Transmitting and receiving MAC-hs and RLC entities would be located in UE and Node B respectively. It is clear to those skilled in the art that signalling messages analogous to the previous explanations may be exchanged. The primitive Reset Req can be used within UE protocol stack as in the downlink case. It has not been decided whether reordering buffer for uplink HARQ is located in the Node B or in the RNC. In both cases some information on logical channel multiplexing should be transmitted to Node B so that appropriate parts of soft buffer (and reordering buffer) are flushed.

The invention claimed is:

1. A method of retransmission protocol reset synchronization in a radio network of a communication system, said radio network including a radio network controller (RNC) for controlling a plurality of base stations in communication with mobile terminals, wherein the RNC communicates with a mobile terminal using a radio link control (RLC) procedure of a plurality of RLC procedures, and the base station communicates with the mobile terminal using a medium access control (MAC) procedure said method comprising the steps of:

performing an RLC reset procedure of said RLC procedure by an RLC sending entity; and initiating a MAC reset procedure in response to the RLC reset procedure, wherein:

parts of a soft buffer, a reordering buffer in the mobile terminal and a priority queue in the base station, associated with the MAC procedure, are each used by more than on RLC procedure of said plurality of RLC procedures for communication between the RNC and the mobile terminal, MAC protocol data units (PDUs) associated with the RLC procedure, which is reset, and remaining in the soft buffer, reordering buffer in the mobile terminal and in the priority queue in the base station are flushed, MAC PDUs associated with other RLC procedures of said plurality of RLC procedures, which are not reset, and remaining in the soft buffer, reordering buffer in the mobile terminal and in the priority queue in the base station are not flushed, and the MAC reset procedure with partial priority queue flush in the base station is initiated when receiving a MAC PDU with predefined inband identification and a reset identification (RID) field, the RID field comprising logical channel identification.

2. The method according to claim 1, wherein the RLC reset procedure is initiated upon an occurrence of an unrecoverable protocol error or upon reaching a predetermined number of retransmissions or upon transmitting a discard notification for a predetermined number of times.

3. The method according to claim 1, wherein the MAC reset procedure is carried out at the base station and the mobile terminal.

4. The method according to claim 1, wherein the MAC reset procedure in the base station is initiated by a MAC release request message sent by the RNC.

5. The method according to claim 1, wherein the MAC reset procedure in the mobile terminal is initiated by a channel reconfiguration message included in a radio resource control (RRC) protocol sent from the RNC to the mobile terminal.

6. The method according to claim 1, wherein the MAC reset procedure in the mobile terminal is initiated by a reset request primitive sent from a receiving RLC entity to a receiving MAC entity upon receiving an RLC RESET PDU.

7. The method according to claim 1, wherein the radio network is a UMTS terrestrial radio access network (UTRAN) using high speed downlink packet access (HSDPA) for data transmission.

8. The method according to claim 7, wherein the RLC procedure and MAC procedure transmit PDUs over the network employing a hybrid automatic repeat request (HARQ) protocol where erroneous packets are stored for subsequent combining.

9. The method according to claim 8, wherein remaining RLC PDUs stored in a priority queue at a base station are not transmitted once an RLC reset procedure has been invoked.

10. The method according to claim 1, wherein the MAC reset procedure with partial priority queue flush in the base station is initiated when receiving a MAC release request message with the RID field as an information element.

11. The method according to claim 1, wherein the radio network is a UMTS terrestrial radio access network using enhanced uplink dedicated channel (EUDCH) access employing a HARQ protocol where erroneous packets are stored for subsequent combining.

* * * * *